Figure 9:
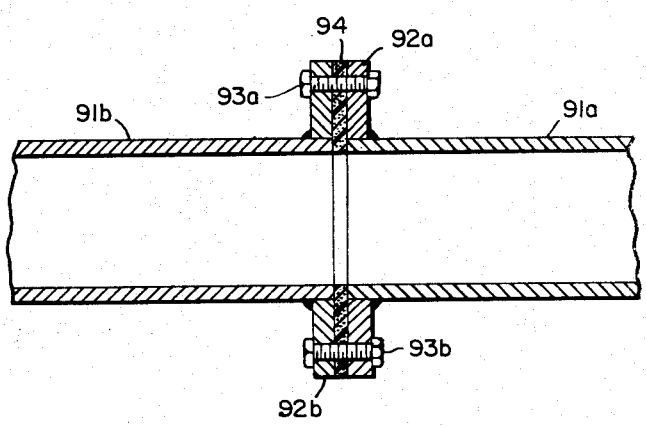

July 7, 1964
J. E. EHRREICH ETAL
3,140,342
ELECTRICAL SHIELDING AND SEALING GASKET
Filed July 5, 1963
2 Sheets-Sheet 1
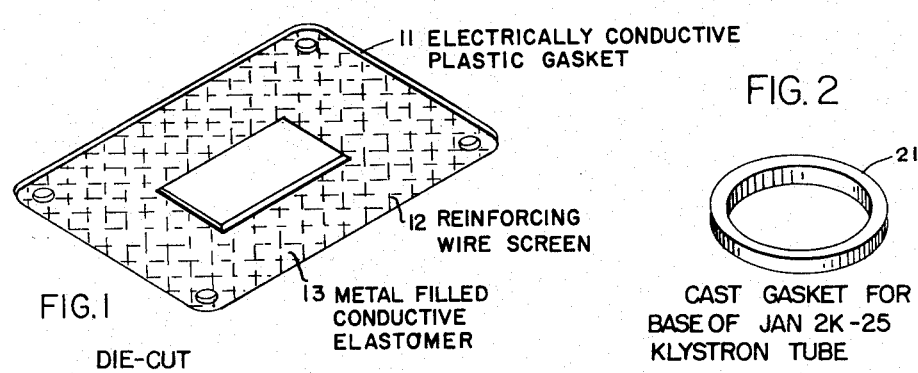
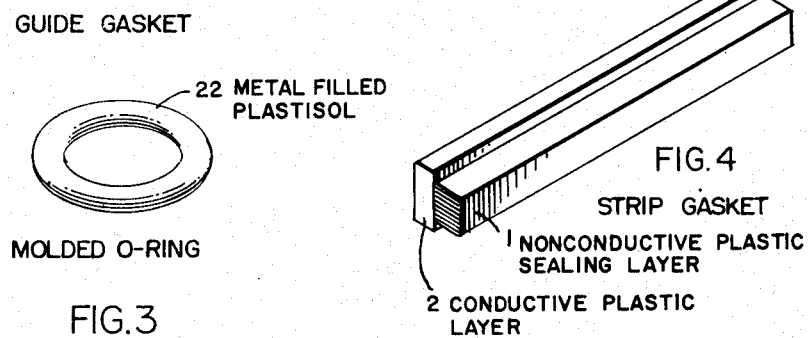
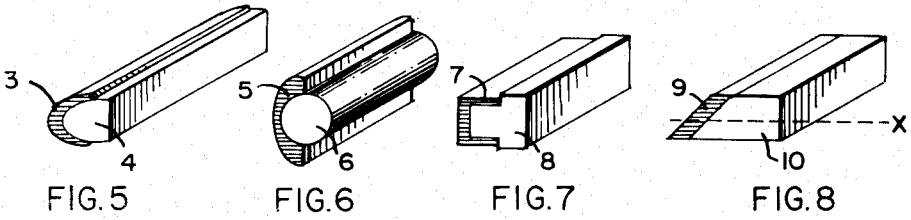
VARIOUS FORMS OF STRIP GASKETS
INVENTORS
JOHN E. EHRREICH
DONALD AVERY
BY
Russell, Chittick, & Pfund
ATTORNEYS United States Patent Office 3,140,342
Patented July 7, 1964

3,140,342
ELECTRICAL SHIELDING AND SEALING GASKET
John E. Ehrreich, Arlington, and Donald H. Avery,
Boston, Mass., assignors to Chomerics, Inc., Cambridge,
Mass., a corporation of Delaware
Filed July 5, 1963, Ser. No. 294,219
11 Claims. (Cl. 174—35)

This invention is concerned with a new article of manufacture: a form stable, flexible, metal-filled highly electrically conductive, plastic gasket useful for providing electrically and hermetically tight seals in such applications as RF (radio frequency) shielding and in microwaveguide sealing.

This application is a continuation-in-part of Ser. No. 232,566 "Conductive Plastic Gasket," filed October 23, 1962, which in turn was a continuation-in-part of Ser. No. 143,619, "Conductive Fillers for Plastics," filed October 9, 1961, and of Ser. No. 153,078, "Conductive Metal Fillers for Plastics," filed November 17, 1961, all by the present inventors. Ser. Nos. 143,619 and 153,078 are now abandoned.

There has been a need for a sealing material based upon a plastic-form material that is highly electrically conductive. Conventional methods for forming electrical joints or connections have several disadvantages. For example, a soldered joint is not easily broken for repairs or modification and cannot be used with aluminum. Woven wire gaskets when properly placed in a flange make an effective electrical joint, but unless special composite rubber-wire gaskets are used they are not weather tight. Also, woven wire gaskets tend to "disappear" at high frequencies because of the spaces between the individual wires. There is a type of metal-rim waveguide gasket available that has knurling on the metal surfaces which gouges and makes electrical contact with the flange faces. This gasket may have an O-ring molded into a special channel in the metal rim to effect a pressure tight seal. This composite gasket is bulky and can be used reliably only once. It is not too effective at high power applications although generally speaking it has been up to now the best type of seal available for microwave flanges.

It has now been found that unusually effective seals for electrical closures can be formed from a compressible or resilient plastic loaded or filled with metal particles. The metal particles are held in electrical particle-to-particle contact by the plastic binder or matrix. Current can thus flow through the plastic matrix via the metal particles. Volume resistivities are below 10 ohm-cm. and can be as low as 0.001 ohm-cm. or lower.

It has been known to load epoxy adhesives with silver powder to form "plastic solders." These solders have been used for such purposes as attaching leads and terminals as on electroluminescent panels, or for filling crevices in waveguides. The art has not appreciated up to now, however, that exceedingly effective conductive seals can be fabricated from an elastomer or other types of compressible plastics loaded with a conductive metal powder.

The conductive plastic seal of this invention has all the advantages of the plastic-form. It can be soft, flexible, and resilient and will comply with flange surfaces without scaring them. Properly designed, molded forms of the seal can be quite abuse resistant. While having the advantage of a plastic-form seal, however, it also has the quality of an electrical seal customarily made from rigid metal.

The seals of this invention can have a variety of shapes to match the closure to be sealed. For example, a conductive plastic gasket can be in the form of molded O-ring seals, cast strips for sealing container openings, gaskets die-cut from sheet stock formed in platen press and the like.

In brief compass, this invention is a gasket for sealing both electrically and against fluid pressure. It consists of a form stable shape comprising a binder of a flexible and compressible plastic having a flow point in excess of 100° loaded in the conductive areas within the range of 10–80 volume percent of metal particles maintained in electrical particle-to-particle contact by the plastic binder. The electrical resistance of the gasket is less than 10 ohm centimeters. The metal particles used may be non-noble metal particles, solid noble metal particles or non-noble metal particles plated with a stable coating of a noble metal, with the latter being preferred. The metal particles may have any shape such as platelet, acicular, rhombic or substantially spherical, with the latter being preferred.

A particularly preferred embodiment of the invention is a strip seal similar to a refrigerator door gasket or the weather seal around the doors of an automobile which consists of an area of metal filled conductive plastic backed-up or reinforced by a more resilient layer of unfilled non-conductive plastic. The more resilient non-conductive plastic layer preferably lies under (with respect to the sealing surface of the strip seal) the conductive portion whereby it reinforces it and gives the overall seal more resiliency and improves its compression set characteristics. While the conductive plastic portion of the strip seal in part contributes to the fluid pressure sealing characteristics of the seal, the unfilled more resilient plastic layer greatly improves the fluid pressure sealing characteristics of the strip seal.

In the drawings:
FIGURE 1 illustrates a die-cut waveguide gasket 11 consisting of a conductive plastic 13 made according to this invention and reinforced with wire screen portions of which are visible to the eye as indicated at 12;
FIGURE 2 shows a cast gasket 12;
FIGURE 3 shows a molded gasket 22;
FIGURE 4 shows a strip gasket having a portion 1 of the present conductive plastic and a portion 2 of a resilient insulating plastic;
FIGURES 5, 6, 7 and 8 illustrate other various forms of strip gaskets having conductive plastic portions 3, 5, 7 and 9 and insulating plastic portions 4, 6, 8 and 10, respectively;
FIGURE 9 illustrates the die-cut gasket of FIGURE 1, designated by 94, in place in a waveguide joint consisting of waveguide sections 91a and 91b ending in two flanges 92a and 92b held together by closure bolts 93a and 93b.

To make an effective electrical seal with a metal-filled plastic, the resistances offered by three types of films must be overcome:
(1) Any insulating films such as oxides on the metal particles themselves.
(2) Insulating films of the plastic matrix that may exist between the particles themselves, or between the particles and the metal surface contacting the plastic mass.
(3) Any insulating films on the metal surface which the plastic mass contacts.

Conductivity of a plastic mass filled with a conductive metal powder depends upon the particle-to-particle contact between the metal particles. Electric current must be able to flow from particle-to-particle, with desirably the lowest amount of contact resistance possible. The noble metals have been used in the past as the conductive metal powders in the plastics because insulating oxide coatings do not form on the particles as is the case with other metal particles such as copper and aluminum. With the non-noble metals the oxide coating that forms on the particles while perhaps only a few atoms thick, has a relatively high resistivity and may prevent the ready flow of current between contiguous particles.

In the present invention metal powders having an outer surface of a non-noble metal that are not inherently conductive powders have been used to load the plastics and make them electrically conductive. Examples of suitable metals are aluminum, nickel, lead, zinc, cadmium, copper and iron. Alloys can, of course, be used such as a tin-lead solder or a brass. Generally speaking, they are electrically conductive only under the proper pressural situation in a flange. The pressure on the metal filled plastic mass overcomes the insulating films of oxide on the metal particles and of the plastic binder between particles, particularly when coarse particles are used, and high point contact pressures are obtained. Thus the current can flow between particles.

Because of the oxide coating problem, it is preferred to use particles that have an outer surface at least of a noble metal and are inherently conductive when in particle-to-particle contact. The particles can be solid noble metal particles or non-noble metal particles overcoated with a protective noble metal coating such as silver or gold. It is much preferred in the present case to use the coated powders because they are less expensive.

The preparations of the two types of the preferred non-noble metal powders coated with a noble metal are described in copending cases "Inexpensive Conductive Metal Filler," Ser. No. 227,756, filed October 2, 1962, and "Iron Based Conductive Filler for Plastics," Ser. No. 227,755, filed October 2, 1962, by the present inventors.

The average particle size of the metal particles used in this invention may range from 100 mils down to 0.05 mil within the range of 0.1 mil to 20 mils being preferred. With metal particles having a non-noble metal outer surface the particle size should be greater than about 5 mils so that high unit contact pressures between particles will result and the effect of the insulating oxide film on the surfaces of the particles will be overcome. In this connection it is preferred to work with "soft" metals or metals that are deformable when the particles have a non-noble metal outer surface because the deformation of the particles when external pressure is applied causes the insulating oxide films to break and better electrical particle-to-particle contact results. The Brinell Hardness of the solid metal content of such particles is preferably 100 or less.

The loading of the metal particles in the plastic mass is in the range of 10 to 80 volume percent, within the range of 20 to 66 volume percent being preferred.

The plastic matrix used should be compressible or responsive to externally applied pressure so that the metal particles will feel the effects of such pressure. With elastomers or other form-stable plastic binders, the compressive modulus at 1000 p.s.i. should preferably result in a deflection of at least 10 percent.

Rigid binders such as diallyl phthalate do not permit the effects of externally applied pressures to be felt by the metal particles.

The plastic matrix used is preferably but not necessarily one that shrinks slightly during curing or drying. This places the plastic under tension which helps to assure that good particle-to-particle contact is maintained.

A soft material if subjected to tensile tends to allow the metal particles to separate with a loss in conductivity. It is desirable therefore to work with a fairly tough elastomer, or to reinforce it to withstand pull along the length of the sheet.

The drawings attached to and forming a part of this specification illustrate various forms of the conductive plastic seals of this invention, as described in the following examples.

*Example I*

A highly electrically conductive gasket (see FIGURE 1) for sealing a microwave flange was made as follows. A silver coated copper powder was prepared in accordance with the example of the above referred to copending application Ser. No. 227,756. Coarse copper powder (Metals disintegrating M.D. 103A) was first cleaned with an acetic acid wash and then replacement plated with silver from a silver cyanide solution containing an abnormally high amount of cyanide ions. Nine weight percent silver was laid down in the above manner to give an electrically adherent coating. The particles had a particle diameter of 2–3 mils and were generally spherical.

About 89 weight percent of the silver-coated copper powder was incorporated into a polyvinyl chloride plastisol having a curing temperature of 330° F. and a viscosity at room temperature in the uncured state of 160,000 cps. (Dewey and Almy Chemical Division, W. R. Grace & Company, Daxene A-60.) The heavy paste obtained was spread into a 30 mesh-10 mil aluminum wire screen (Newark Wire Cloth Co.). The filled screen was cured in an oven at 330° F. for 8 minutes. The reinforced sheet obtained a thickness of about 22 mils. It had a weight of 1.18 grams per inch. About 17 weight percent of the sheet consisted of the wire screen and 83 weight percent consisted of the conductive metal-filled plastic.

The cured sheet was rolled (2 passes) in a rolling mill, one customarily used to roll steel sheets, at an average rolling pressure of 850/lbs./in. of width. The reduction obtained was 30% and the final thickness of the sheet was 17 mils. This rolling impressed the screen somewhat into the sheet so that the wire of the screen was not at the surface of the sheet.

A gasket for a 8.6 kilomegacycle (X-band) RG51/U waveguide flange was die-cut from the sheet stock at an angle of 45° from the warp of the screen. When tested at an internal air pressure of 25 lbs. per sq. inch at 2.5 megawatt peak load and 2.5 kilowatt average load, the insertion loss for the gasket was 0.005 decibel. This was considerably better than the performance obtained from a commercial machined metal-molded O-ring composite seal tested in the same apparatus. In this case, the peak power that could be obtained was only 1.6 megawatts.

The isolation afforded by the gasket was in excess of 85 decibels.

In additional tests, a gasket of the same type was able to withstand a continuous load of 6 kilowatts without arcing in a continuous wave X-band testing unit.

The use of the polyvinyl chloride plastisol binder of this example represents a particularly preferred embodiment of this invention. There are only a few binders available that are liquids before curing and permit direct incorporation of a conductive metal filler by simple mixing. With other types of binders the metal filler may have to be incorporated by milling or through the use of solvents. Silicones and urethanes are additional examples of plastics that are liquids before curing but both rely on a catalyst for curing which may be affected by the metal particles. A P.V.C. plastisol, however, is a one component system of indefinite pot life and is unaffected by the presence of metal particles.

Another preferred type of conductive metallic filler has been made by the silver-plating technique used to prepare the coarse filler used in this example. Chopped copper wire (Metallurgia CH/3162) the particles of which are about ¼ long and 4 mils thick is plated by the above technique with the amount of silver on a weight basis deposited being about ⅓ the amount used for the spherical particles. This conductive chopped wire filler is used at loadings of about 60 weight percent in plastic binders to impart conductivity. It has the advantages of being non-shedding and of imparting to the conductive plastic greater resistance to flexing or bending. It is particularly useful in the preparation of strip seals such as those described below.

*Example II*

A silver-copper coated iron powder is prepared in the manner described in copending application Ser. No. 227,755. The base iron powder has a surface area of 70 square feet per pound, and an average particle diameter of 3 mils. It is first replacement coated with 18 mole percent copper from a copper sulphate solution and then 12 mole percent of the copper is replaced with silver from a silver cyanide solution. The silver coated powder in loose form has a volume resistivity under 0.5 ohm per centimeter as measured by probes from a volt-ohm meter.

The plastisol of Example I is filled with 80 weight percent of the coated powder and cast into a ring 2½ inches O.D., 2¼ inches I.D. and 3/16 of an inch thick. It has a resistivity of about 0.05 ohm-cm. and a permeability of 5 to 10. It is used to seal the base of a klystron tube (JAN 2K–25).

*Example III*

9.6 parts by weight of a silicone resin (Dow Corning 601) is loaded with 90 parts by weight of the silver-plated particles of Example I. The filled resin cures in 7 minutes at 300° F. upon the addition of 0.4 part by weight of a catalyst (Dow Corning 601 catalyst). The catalyst is added to the silver loaded resin and the mixture is cast into an unreinforced 90 mil thick sheet stock using a heated platen press. Five by six inch sections are cut from this sheet stock and placed within the lid of a shielded container having several interior compartments that must be electrically sealed from each other.

*Example IV*

A reinforced microwave flange gasket was prepared as in Example I with the exception being that the M.D. 130 A powder was used per se, i.e. it was not replacement plated. The plastic sheet was initially conductive when tested with the probes of a volt-ohm meter. When tested for insertion loss in the same equipment its performance was about the same as that of the reinforced gasket of Example I.

*Example V*

A gasket is made up using the same resin as in Example I. The conductive metal filler consists of 94 percent of the conductive powder of Example I and 6 percent of a fine silver flake (Handy & Harmon Silflake 135). A 60 mil sheet of the resin filled with 88 weight percent of the combined metal powders is cast by means of a heated platen press. A gasket whose outside dimensions are 4 inches by 4 inches and inside dimensions are 3 inches by 3 inches is cut from the sheet stock and is used to seal an access panel on an electronic equipment cabinet.

*Example VI*

An O-ring seal for a UG–40B/U Choke Flange was molded from the polyvinyl chloride plastisol described in Example I loaded with 70 weight percent of a fine silver flake (Handy & Harmon Silflake 135). The O-ring (see FIG. 3) had an internal diameter of 1.338 inches and the rim had a diameter of 0.092 inch in cross-section.

*Example VII*

FIGURES 4 and 5 illustrate various forms of the strip seals of this invention. FIGURE 4 illustrates the simplest form where a strip of the molded conductive plastic is adhered to a strip of more flexible and compressible unfilled plastic 2. It is preferred in this situation that the unfilled plastic 2 extend slightly beyond the sealing surfaces of the conductive portion 1 so that a better pressure seal is obtained.

FIGURES 5, 6, 7 and 8 illustrate other forms of the strip seal of this invention wherein the more compressible unfilled insulating plastic layer forms a core or is underneath the conductive layer with respect to the sealing surface so that it reinforces it and gives it more resiliency. The conductive layer is illustrated by 3, 5, 7 and 9 and insulating plastic layer by 4, 6, 8 and 10. The insulating plastic layer can be a soft compressible material like natural, silicon or urethane rubber and may be a plastic foam such as a foamed polyurethane. The dimensions of the gaskets are such of course, that they fit the intended application. Usually they are contained in some sort of channel on the equipment being sealed, being adhered in the channel in some cases with a conductive plastic cement.

The strip seal illustrated in FIGURE 8 was designed to replace the woven wire seals customarily used in the construction shielded containers and enclosures. The metal powder used to impart conductivity was coarse copper shot having an average particle size of 14 mils (Metal Disintegrating MD–46 HP). The plastic matrix used was the plastisol of Example I. This strip seal was formed by means of a mold cavity having the shape of the gasket and being positioned such that the X axis of the gasket was vertical with the conductive portion 9 having at the bottom.

The plastisol was deliberately underfilled (40 weight percent loading) such that during the heat fluxing of the plastisol the heavy metal particles settled in the position shown. The gasket had a thickness of 0.20 inch and a maximum width of 0.75 inch. The beveled edge made a 45° angle with the longest side.

This strip seal arrangement was developed because highly loading a plastic with the amount of metal particles required to assure good electrical conductivity reduces the compressibility of the plastic mass. The under cutting of the conductive plastic layer with the more resilient unfilled plastic gives the strip seal much better fluid pressure sealing properties. The conductive layer is able to make good electrical contact with flange faces while the unfilled portion of the strip seal makes a good pressure and weather tight seal.

When using a very coarse powder as a filler in a flexible or elastomeric binder, conductivity along the longitudinal axis of the shape may readily be lost by bending or stretching. The use of fine conductive powders such as fine silver flakes helps to overcome this and the use of silver platelets in combination with coarse powders is particularly advantageous. This does not mean however, that gasket loaded only with coarse conductive powder is not suitable for some purposes. For example, in an R.F. shielding application where it is desired for an electrical connection to be made between two conductive surfaces—such as between two metal flange faces, and conductivity along the axis of the space defined by the faces is not required, a gasket based on a coarse metallic filler is suitable. Even if the particles had separated somewhat because of flexing or relaxation of the plastic binder, the exerting of even a modest amount of compressive force on the filled plastic will bring the metal particles into electrical particle-to-particle contact in the direction transverse to the surfaces so that electric current can flow therebetween. Very coarse particles get a good "bite" into the surface in this situation which assures that a good electrical connection is obtained. As an illustration, the resin of Example I was loaded with 86 weight percent of an atomized copper powder having an average particle size of 10 mils, and cast as a sheet ⅛ inch thick. The sheet initially was highly conductive along its major axis, but this conductivity was quickly lost with moderate flexing. However, by exerting a slight pressure on the flat surfaces conductivity could be regained therebetween. This effect is not observed when rigid or non-elastomeric binders are used unless very considerable pressures are applied.

The term "plastic" is intended to include resins and elastomers (rubbers) besides the conventionally accepted plastics such as polyethylene and the epoxies. The plastic matrix used can be thermosetting or thermoplastic, depending upon the use to which the gasket is to be put. Asphalts, polyurethane, polyesters, acrylates, polyamides and natural rubber are additional examples of suitable matrices.

The term "matrix" means "something holding or capable of holding embedded within it another object to which it gives shape or form" (The Winston Dictionary: College Edition, The John C. Winston Company, Philadelphia, Pa., 1946).

The term "conductive metal powder" means a particulate powder having an outer surface of a noble metal, such as solid gold powder or the silver coated powder of Example I, which is so inherently conductive when maintained in particle-to-particle contact in loose form (i.e. in the absence of plastic matrix) as to have a volume resistivity of less than 10 ohm-cm. as measured by the probes of a volt-ohm meter, particularly after having been maintained in an oven at 400° F. for 24 hours in the presence of a circulating air atmosphere.

Having described this invention, what is sought to be protected by Letters Patent is succinctly set forth in the following claims.

We claim:

1. As an article of manufacture, an electro-magnetic energy shielding gasket having a form-stable definite shape and adapted to fit a closure to be sealed and to seal said closure electrically, comprising a matrix binder of a flexible and compressible plastic having a flow point in excess of about 100° C. loaded with within the range of 10 to 80 volume percent of metal particles held in electrical particle-to-particle contact therein, the largest dimension of said metal particles not being greater than ¼ of an inch and the electrical resistance of said gasket being less than 10 ohms-centimeters.

2. The article of claim 1 wherein at least a substantial portion of said metal particles have a continuous noble metal surface and an average particle size in the range of 0.1 to 20 mils, wherein said gasket contains in the range of 20 to 66 volume percent thereof, and wherein said gasket has an electrical resistance of less than 0.001 ohm-centimeter.

3. The article of claim 2 wherein said metal particles consist of silver-plated copper particles.

4. The article of claim 1 wherein said metal particles have an average size in the range of 0.1 to 100 mils in the case of conductive metal powders having a continuous outer surface of a noble metal and a size in the range of 5 to 100 mils in the case of other metal powders having a surface of a non-noble metal, and the loading thereof is in the range of 20 to 66 volume percent.

5. The article of claim 1 wherein said article has an open interior portion and the rim thereof is contoured with respect to the mid-plane of said article.

6. The article of claim 1 wherein said article is in the form of an elongated strip seal and wherein said matrix binder loaded with said metal particles is composited with a substantially more flexible and compressible non-electrically conductive plastic; said gasket in cross-section having two opposed electrically conductive sealing surfaces, with the electrically conductive portion of the gasket extending therebetween and, with the relatively more compressible non-electrically conductive plastic extending under and backing-up said electrically conductive portion with respect to said two opposed sealing surfaces.

7. The article of claim 1 wherein said article is flat and substantially uniform in thickness.

8. The gasket of claim 1 wherein said flexible and compressible plastic is a material selected from the group consisting of polyvinyl chloride plastisols, urethanes and silicones.

9. A detachable sealed joint comprising two mating metallic flange members and interposed therebetween in electrical sealing contact therewith an electromagnetic energy sealing gasket having a form-stable definite shape comprising a matrix binder of a flexible and compressible plastic having a flow point in excess of about 100° C. and loaded with within the range of 10 to 80 volume percent of metal particles held in electrical particle-to-particle contact therein, the largest dimension of said metal particles not being greater than ¼ of an inch and the electrical resistance of said gasket being less than 10 ohms-centimeters.

10. The sealed joint of claim 9 wherein said metal particles consist of a conductive metal powder and said joint is a flange joint in a microwaveguide assembly.

11. The sealed joint of claim 9 wherein said electromagnetic energy sealing gasket also is in fluid pressure sealing contact with said two mating metallic flanges.

References Cited in the file of this patent

UNITED STATES PATENTS

| | | |
|---|---|---|
| 2,370,242 | Hensel et al. | Feb. 27, 1945 |
| 2,638,523 | Rubin | May 12, 1953 |
| 2,966,539 | Sears et al. | Dec. 27, 1960 |
| 3,003,975 | Louis | Oct. 10, 1961 |

FOREIGN PATENTS

| | | |
|---|---|---|
| 519,298 | Great Britain | Mar. 21, 1940 |
| 489,721 | Great Britain | Aug. 2, 1958 |
| 1,073,055 | Germany | Jan. 14, 1960 |